US012371837B2

(12) United States Patent
Song et al.

(10) Patent No.: US 12,371,837 B2
(45) Date of Patent: Jul. 29, 2025

(54) ELECTRONIC APPARATUS AND CONTROL METHOD THEREOF

(71) Applicant: SAMSUNG ELECTRONICS CO., LTD., Suwon-si (KR)

(72) Inventors: Hoyoon Song, Suwon-si (KR); Seho Oh, Suwon-si (KR); Seungjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 17/961,873

(22) Filed: Oct. 7, 2022

(65) Prior Publication Data

US 2023/0183905 A1 Jun. 15, 2023

Related U.S. Application Data

(63) Continuation of application No. PCT/KR2022/011943, filed on Aug. 10, 2022.

(30) Foreign Application Priority Data

Dec. 10, 2021 (KR) ........................ 10-2021-0176618

(51) Int. Cl.
*D06F 33/47* (2020.01)
*D06F 34/05* (2020.01)
(Continued)

(52) U.S. Cl.
CPC .............. *D06F 33/47* (2020.02); *D06F 34/05* (2020.02); *D06F 2103/16* (2020.02); *D06F 2103/38* (2020.02); *D06F 2105/58* (2020.02)

(58) Field of Classification Search
CPC .............................. D06F 33/47; D06F 2103/38
See application file for complete search history.

(56) References Cited

U.S. PATENT DOCUMENTS

| 10,174,452 B2 | 1/2019 | Choi |
| 11,150,676 B2 | 10/2021 | Lee |
| 11,212,388 B2 | 12/2021 | Kim et al. |
| 11,326,291 B2 | 5/2022 | Park et al. |
| 11,384,464 B2 | 7/2022 | Kim et al. |

(Continued)

FOREIGN PATENT DOCUMENTS

| CN | 108625096 B | 7/2021 |
| EP | 2746452 B1 | 6/2014 |

(Continued)

OTHER PUBLICATIONS

International Search Report (PCT/ISA/210), dated Dec. 1, 2022, issued by the International Searching Authority, Application No. PCT/KR2022/011943.

(Continued)

*Primary Examiner* — Michael E Barr
*Assistant Examiner* — Kevin G Lee
(74) *Attorney, Agent, or Firm* — Sughrue Mion, PLLC

(57) ABSTRACT

Disclosed is an electronic apparatus which includes a memory storing a first neural network model and a second neural network model; and a processor connected to the memory configured to control the electronic apparatus, and the processor may obtain context information of a user, operation information, and environment information of a washing machine, identify an active time and an inactive time of the user by inputting the context information into the first neural network model, obtain one or more freezing probabilities by time zones of the washing machine by inputting the operation information and the environment information into the second neural network model based on a current point in time being within the active time, and identify a freezing probability greater than or equal to a threshold freezing probability during the active time and the inactive time based on the obtained one or more freezing probabilities by time zones.

18 Claims, 17 Drawing Sheets

(51) Int. Cl.
   *D06F 103/16* (2020.01)
   *D06F 103/38* (2020.01)
   *D06F 105/58* (2020.01)

(56) References Cited

U.S. PATENT DOCUMENTS

| | | | | |
|---|---|---|---|---|
| 2014/0158210 | A1* | 6/2014 | Kim | D06F 39/088 137/2 |
| 2017/0350067 | A1 | 12/2017 | Choi | |
| 2020/0190721 | A1 | 6/2020 | Kim et al. | |
| 2021/0087732 | A1* | 3/2021 | Park | D06F 33/00 |
| 2021/0164144 | A1 | 6/2021 | Hahn et al. | |

FOREIGN PATENT DOCUMENTS

| | | | | |
|---|---|---|---|---|
| KR | 10-0762266 B1 | 10/2007 | | |
| KR | 10-2010-0001509 A | 1/2010 | | |
| KR | 10-2012-0011637 A | 2/2012 | | |
| KR | 10-2017-0137505 A | 12/2017 | | |
| KR | 10-2019-0024440 A | 3/2019 | | |
| KR | 10-2019-0116189 A | 10/2019 | | |
| KR | 10-2020-0027076 A | 3/2020 | | |
| KR | 2020027076 A | * 3/2020 | | D06F 33/00 |
| KR | 10-2021-0067691 A | 6/2021 | | |
| WO | 2020/122294 A1 | 6/2020 | | |

OTHER PUBLICATIONS

Written Opinion (PCT/ISA/237), dated Dec. 1, 2022, issued by International Searching Authority, Application No. PCT/KR2022/011943.

Communication dated Oct. 14, 2024, issued by the European Patent Office for European Patent Application No. 22904386.4.

* cited by examiner

FIG. 8

| WASHING HISTORY FOR ONCE | |
|---|---|
| DEVICE ID | FINAL DEHYDRATION SUCCESS |
| DRUM/TOP LOADER DIVISION | BLANKET COURSE |
| CYCLE COUNT | CYCLE COUNT |
| ERROR CODE | POWER CONSUMPTION |
| COURSE NUMBER (SCUBE INDEX USE) | DURATION UNTIL CYCLE ENDING |
| TEMPERATURE (SCUBE INDEX USE) | DP TIME |
| SOIL LEVEL (SCUBE INDEX USE) | DEHYDRATION RETRY NUMBER= DRUM, ALL-AUTOMATIC |
| RINSING NUMBER (SCUBE INDEX USE) | DEHYDRATION RETRY NUMBER, SUB SECTION (DRUM), SRUB SECTION (ALL-AUTOMATIC) |
| DEHYDRATION (SCUBE INDEX USE) | DEHYDRATION RETRY NUMBER, SR SECTION (DRUM), SDM SECTION (ALL-AUTOMATIC) |
| DRY (SCUBE INDEX USE) | DEHYDRATION RETRY NUMBER, SPS SECTION (DRUM), SHM SECTION (ALL-AUTOMATIC) |
| DRY CLOTH WEIGHT DETECTION | DRAINAGE FILTER NOTIFICATION |
| TEMPERATURE UPON COMPLETING WATER SUPPLY TO WASHING MACHINE | SOUND-OFF (ALARM-OFF) SETTING |
| TEMPERATURE OF ONE MINUTE BEFORE COMPLETION OF WASHING | SMART CHECK (SMART CARE) USE TIMES |
| MAX TEMPERATURE DURING WASHING | WASHING COURSE REFERENCE TABLE NUMBER (1/2/3) |
| TEMPERATURE UPON COMPLETION OF WATER SUPPLY FOR FINAL RINSING | AI FUNCTION DEVICE AVAILABILITY (0: NO/1: YES) |
| MAX TEMPERATURE DURING WASHING PROCESS | ON-DEVICE AI FUNCTION SETTING ON/OFF (0-OFF/1-ON) |
| REASON OF DOOR LOCK DURING ENDING | AI FUNCTION USE (0-NO/1-YES) |
| DRY TEMPERATURE FOR HC2 GENERATION | WASHING TEMPERATURE USED FOR OPTION SETTING |
| DRY OPERATION, HEATER ON | RINSING TIMES USED FOR OPTION SETTING |
| MAX DURING HEATER ON-OFF OF DRY PROCESS | DEHYDRATION INTENSITY USED FOR OPTION SETTING |
| DETERGENT TRAY CLOSE DETECTION BEFORE DETERGENT INPUT | BOOKING FUNCTION USE |
| DETERGENT SHORTAGE CHECK BEFORE DETERGENT INPUT | BOOKING SETTING TIME FOR USING BOOKING FUNCTION, BASED ON FINAL VALUE BEFORE EXECUTING 'START' |
| SOFTENER SHORTAGE CHECK BEFORE DETERGENT INPUT | INITIAL DETERGENT INPUT AMOUNT |
| DETERGENT INPUT MOTOR UPON DETERGENT INPUTTING | AFTER TURBIDITY MEASUREMENT, ADDITIONAL DETERGENT INPUT AMOUNT |
| SOFTENER INPUT MOTOR UPON SOFTENER INPUTTING | ADDITIONAL DETERGENT INPUT TIME |
| DETERGENT SETTING VALUE UPON DETERGENT INPUTTING | MEASURED TURBIDITY VALUE (AI WASHING COURSE) |
| SOFTENER SETTING VALUE UPON SOFTENER INPUTTING | ADDITIONAL WASHING TIME AFTER TURBIDITY MEASUREMENT |
| WASHING WATER SUPPLY TIME | WASHING PROCESS TIME (ONLY WASHING) |
| FIRST RINSING WATER DRAIN TIME - UPON ENDING OF DRAIN | REGISTERED TIME |
| WEIGHT DETECTION RESULT OF DEHYDRATION (FINAL DEHYDRATION) | MEMS X MAX VALUE |

ELECTRONIC APPARATUS AND CONTROL METHOD THEREOF

CROSS-REFERENCE TO RELATED APPLICATION(S)

This application is a bypass continuation of International Application No. PCT/KR2022/011943, filed on Aug. 10, 2022, which is based on and claims priority to Korean Patent Application No. 10-2021-0176618, filed on Dec. 10, 2021, in the Korean Intellectual Property Office, the disclosures of which are incorporated by reference herein in their entireties.

BACKGROUND

1. Field

The disclosure relates to an electronic apparatus and a control method thereof and, more specifically, to an electronic apparatus for identifying a freezing probability of a washing machine during an active time and inactive time of a user, and a control method thereof.

2. Description of Related Art

A washing machine is a machine that washes clothes, and uses water. At this time, freezing may occur in a faucet from which water comes out, a washing tub of the washing machine, a residual water hose, a drain hose, etc., and a related-art washing machine simply provides a freezing error if there is no flow of water over a specific period of time for each part.

The occurrence of the freezing error is affected by the ambient temperature of the washing machine, the operation of the washing machine, and the like, in addition to low outside temperature. In particular, even if the area and the outside temperature are the same, the probability of occurrence of a freezing error may vary depending on whether the washing machine is operated or an installation environment. Therefore, even if the related-art washing machine provides a freezing error, there is a problem that freezing may not occur, and accuracy may be low.

A general freezing prediction neural network model may predict freezing by using ambient temperature and environmental data of the washing machine, but it is only possible to provide one-way notification in a state in which the environment and the active time of the user are not considered. Even if the user receives the freezing notification, the washing machine may not cope with the freezing and in this case, the washing machine may be slowly frozen, lowering the washing efficiency and finally reaching the freezing state.

When the washing machine is in a freezing state, the lifespan of the washing machine is shortened and the operation of the washing machine is impossible until the freezing state is released, and the performance of the motor may be reduced. Accordingly, as the user identifies the freezing time point of the washing machine, dissatisfaction with the washing machine may increase and reliability of the washing machine may decrease, and the lifespan of the washing machine may be shortened.

There is a necessity of developing a freezing prediction method that may solve the above problem.

SUMMARY

An objective of the disclosure is to provide an electronic apparatus providing a more precise freezing prediction method in consideration of a user's state and a control method thereof.

According to an embodiment, an electronic apparatus includes a memory storing a first neural network model and a second neural network model; and a processor connected to the memory configured to control the electronic apparatus, and the processor may be configured to obtain context information of a user, operation information of a washing machine, and environment information of the washing machine, identify an active time of the user and an inactive time of the user by inputting the context information into the first neural network model, obtain one or more freezing probabilities by time zones of the washing machine by inputting the operation information and the environment information to the second neural network model based on a current point in time being within the active time, and identify a freezing probability greater than or equal to a threshold freezing probability during the active time and the inactive time based on the obtained one or more freezing probabilities by time zones.

The electronic apparatus is further comprising: a communication interface, wherein the processor is further configured to: receive the context information of the user from a user terminal through the communication interface, receive the operation information and the environment information from the washing machine through the communication interface, and control the communication interface to transmit the identified freezing probability to the user terminal.

The processor is further configured to obtain the one or more freezing probabilities by time zones for each of a plurality of configurations included in the washing machine by inputting the operation information and the environment information to the second neural network model.

The processor is further configured to: based on identifying the freezing probability greater than or equal to a first threshold freezing probability during the active time and the inactive time, among the obtained one or more freezing probabilities by time zones, provide a freezing measure guide, and based on identifying the freezing probability greater than or equal to a second threshold freezing probability and less than the first threshold freezing probability during the active time and the inactive time, among the obtained one or more freezing probabilities by time zones, provide a freezing prevention guide.

The processor is further configured to: based on a point in time after a threshold time from the current point in time being within the active time, re-obtain the context information, the operation information, and the environment information after the threshold time from the current point in time, re-identify the active time and the inactive time of the user by inputting the re-obtained context information to the first neural network model, based on a point in time after the threshold time from the current point in time being within the re-identified active time, re-obtain the one or more freezing probabilities by time zones of the washing machine by inputting the re-obtained operation information and the re-obtained environment information to the second neural network model, and identify a second freezing probability greater than or equal to the threshold freezing probability during the re-identified active time and the re-identified inactive time among the re-obtained one or more freezing probabilities by time zones.

The processor is further configured to: based on a point in time after a threshold time from the current point in time not being within the active time, re-obtain the context information, the operation information, and the environment information at a point in time after the end of the active time, re-identify the active time and the inactive time of the user by inputting the re-obtained context information to the first neural network model, based on the point in time after the end of the active time being within the re-identified active time, re-obtain the one or more freezing probabilities by time zones of the washing machine by inputting the re-obtained operation information and the re-obtained environment information to the second neural network model, and identify a second freezing probability greater than or equal to the threshold freezing probability during the re-identified active time and the re-identified inactive time among the re-obtained one or more freezing probabilities by time zones.

The context information comprises at least one of a use history of a user terminal or washing machine use history of the user, and wherein the operation information comprises at least one of inside temperature of the washing machine, washing time of the washing machine, washing temperature of the washing machine, or power consumption of the washing machine.

The processor is configured to: identify a plurality of active times of the user and a plurality of inactive times of the user by inputting the context information to the first neural network model, obtain the one or more freezing probabilities by time zones of the washing machine by inputting the operation information and the environment information to the second neural network model based on the current point in time being within one active time among the plurality of active times, and identify, among the obtained one or more freezing probabilities by time zones, a third freezing probability greater than or equal to the threshold freezing probability during the one active time and immediately after the one active time among the plurality of inactive times.

The first neural network model is obtained by learning a relationship of sample context information with respect to a sample active time through a first artificial intelligence algorithm, and wherein the second neural network model is obtained by learning a relationship of sample operation information with respect to a sample environment information by time zones through a second artificial intelligence algorithm.

The electronic apparatus is the washing machine, and further comprises: a communication interface; and a sensor, wherein the processor is further configured to: receive the context information of the user from the user terminal through the communication interface, obtain the operation information from the memory, obtain the environment information through the sensor, and control the communication interface to transmit the identified freezing probability to the user terminal.

The electronic apparatus is the user terminal and further comprises: a communication interface; and a display, wherein the processor is further configured to: obtain the context information of a user from the memory, receive the operation information and the environment information from the washing machine through the communication interface, and control the display to display the identified freezing probability.

According to an embodiment, a method of controlling an electronic apparatus includes obtaining context information of a user, operation information of a washing machine, and environment information of the washing machine; identifying an active time of the user and an inactive time of the user by inputting the context information into a first neural network model; obtaining one or more freezing probabilities by time zones of the washing machine by inputting the operation information and the environment information to a second neural network model based on a current point time being within the active time; and identifying a freezing probability greater than or equal to a threshold freezing probability during the active time and the inactive time among the obtained one or more freezing probabilities by time zones.

The obtaining the context information, the operation information, and the environment information further comprises: receiving the context information of the user from a user terminal and receiving the operation information and the environment information from the washing machine, wherein the method further comprises transmitting the identified freezing probability to the user terminal.

The obtaining the one or more freezing probabilities by time zones comprises obtaining the one or more freezing probabilities by time zones for each of a plurality of configurations included in the washing machine by inputting the operation information and the environment information to the second neural network model.

The identifying the freezing probability greater than or equal to the threshold freezing probability comprises: based on identifying the freezing probability greater than or equal to a first threshold freezing probability during the active time and the inactive time, among the obtained one or more freezing probabilities by time zones, providing a freezing measure guide, and based on identifying the freezing probability greater than or equal to a second threshold freezing probability and less than the first threshold freezing probability during the active time and the inactive time, among the obtained one or more freezing probabilities by time zones, providing a freezing prevention guide.

According to an embodiment, an electronic apparatus for identifying a freezing state of a washing machine includes at least one memory configured to store program code; and at least one processor configured to read the program code and operate as instructed by the program code. The program code includes first obtaining code configured to cause the at least one processor to obtain context information of a user, operation information of a washing machine, and environment information of the washing machine; first identifying code configured to cause the at least one processor to identify an active time of the user and an inactive time of the user by inputting the context information into the first neural network model; second obtaining code configured to cause the at least one processor to obtain one or more freezing probabilities by time zones of the washing machine by inputting the operation information and the environment information to the second neural network model based on a current point in time being within the active time; and second identifying code configured to cause the at least one processor to identify a freezing probability greater than or equal to a threshold freezing probability during the active time and the inactive time based on the obtained one or more freezing probabilities by time zones.

The program code further includes first reobtaining code configured to cause the at least one processor to, based on a second point in time being within the active time, re-obtain the context information, the operation information, and the environment information at the second point in time, wherein the second point in time is a threshold time after the current point in time; re-identifying code configured to cause the at least one processor to re-identify the active time of the user and the inactive time of the user by inputting the re-obtained context information to the first neural network model; second reobtaining code configured to cause the at least one processor to, based on the second point in time being within the re-identified active time, re-obtain the one or more freezing probabilities by time zones of the washing machine by inputting the re-obtained operation information and the re-obtained environment information to the second neural network model; and third identifying code configured to cause the at least one processor to identify a second freezing probability greater than or equal to the threshold freezing probability during the re-identified active time and the re-identified inactive time among the re-obtained one or more freezing probabilities by time zones.

The program code further includes first reobtaining code configured to cause the at least one processor to, based on a second point in time not being within the active time, re-obtain the context information, the operation information, and the environment information at the end of the active time, wherein the second point in time is a point in time after a threshold time from the current point in time; re-identifying code configured to cause the at least one processor to re-identify the active time of the user and the inactive time of the user by inputting the re-obtained context information to the first neural network model; second reobtaining code configured to cause the at least one processor to, based on the end of the active time being within the re-identified active time, re-obtain the one or more freezing probabilities by time zones of the washing machine by inputting the re-obtained operation information and the re-obtained environment information to the second neural network model; and third identifying code configured to cause the at least one processor to identify a second freezing probability greater than or equal to the threshold freezing probability during the re-identified active time and the re-identified inactive time among the re-obtained one or more freezing probabilities by time zones.

According to various embodiments of the disclosure, the electronic apparatus may provide a freezing alarm with a high accuracy by obtaining a freezing probability for each time zone of the washing machine in consideration of the operation information and the environment information of the washing machine.

Since the electronic apparatus predicts the freezing of the washing machine in consideration of the active time of the user as well as the inactive time, it is possible to take actions even if the washing machine is likely to be frozen.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 7 to 9 are diagrams illustrating learning of a second neural network model according to an embodiment of the disclosure;

DETAILED DESCRIPTION

Figure 1:
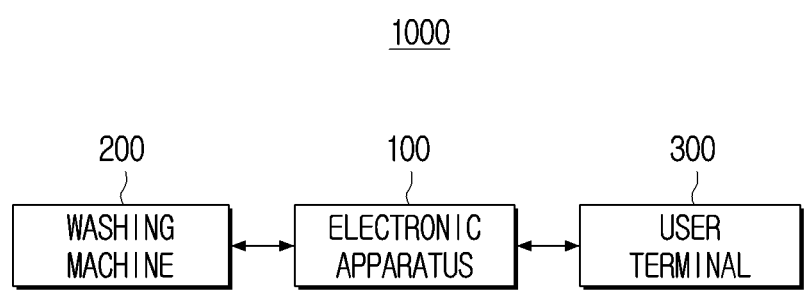
FIG. 1 is a block diagram illustrating a configuration of an electronic system according to an embodiment of the disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The disclosure will be described in greater detail with reference to the attached drawing.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

It is to be understood that the terms such as "comprise" or "consist of" may be used herein to designate a presence of a characteristic, number, step, operation, element, component, or a combination thereof, and not to preclude a presence or a possibility of adding one or more of other characteristics, numbers, steps, operations, elements, components or a combination thereof.

The expression "At least one of A or/and B" should be understood to represent "A" or "B" or any one of "A and B".

As used herein, terms such as "first," and "second," may identify corresponding components, regardless of order and/or importance, and are used to distinguish a component from another without limiting the components.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

In this disclosure, a term "user" may refer to a person using an electronic apparatus or an apparatus (for example: artificial intelligence (AI) device) which uses an electronic apparatus.

Hereinafter, an example embodiment of the disclosure will be described in greater detail with reference to the accompanying drawings.

FIG. 1 is a block diagram illustrating a configuration of an electronic system 1000 according to an embodiment of the disclosure. As illustrated in FIG. 1, an electronic system 1000 includes an electronic apparatus 100, a washing machine 200, and a user terminal 300.

The electronic apparatus 100 is an apparatus for identifying a freezing probability of a washing machine, and may be a server, a desktop PC, a notebook, a smartphone, a tablet PC, a TV, a set-top box (STB), or the like. The embodiment is not limited thereto, and the electronic apparatus 100 may be any device that identifies the probability of freezing of the washing machine.

The electronic apparatus 100 may communicate with the washing machine 200 and the user terminal 300. For example, the electronic apparatus 100 may receive operation information, environment information, and the like, of the washing machine 200 from the washing machine 200, and may receive context information of a user from the user terminal 300.

The electronic apparatus 100 may identify an active time and an inactive time of a user based on context information of a user, obtain a freezing probability for each time zone of the washing machine based on the operation information and the environment information, and identify a freezing probability that is greater than or equal to a threshold freezing probability during an active time and an inactive time during the obtained freezing probability of each time zone. The electronic apparatus 100 may transmit the identified freezing probability to the user terminal 300.

The washing machine 200 may transmit operation information and environment information of the washing machine 200 to the electronic apparatus 100. The operation information of the washing machine 200 may include information about an operation time, an operation course, an error history, and the like of the washing machine 200.

The embodiment is not limited thereto, and the washing machine 200 may transmit the identification information of the washing machine 200 to the electronic apparatus 100.

The user terminal 300 is a device to transmit the context information of the user to the electronic apparatus 100, and the user terminal 300 may be a device that a user holds, such as a smartphone. In this case, the user terminal 300 may transmit the usage state, location information, etc. of the user terminal 300 to the electronic apparatus 100 as the user's context information.

However, the user terminal 300 may be a device that a user uses, such as a desktop PC, a notebook computer, a tablet PC, a TV, a set-top box (STB), and the like. In this case, the user terminal 300 may transmit the usage status of the user terminal 300 to the electronic apparatus 100 as the user's context information.

The user terminal 300 may include all of the plurality of devices mentioned above. For example, the smartphone may transmit the use state of the smartphone, the location information to the electronic apparatus 100, and the TV may transmit the use state of the TV to the electronic apparatus 100. In this case, the electronic apparatus 100 may integrate the received information to identify the user's active time and the inactive time.

The user's context information may include a usage pattern of the washing machine 200 of the user.

Figure 2:
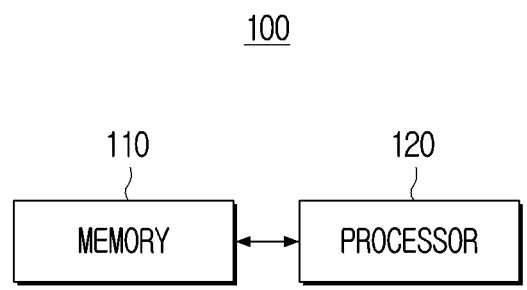
FIG. 2 is a block diagram illustrating a configuration of an electronic apparatus according to an embodiment of the disclosure.

FIG. 2 is a block diagram illustrating a configuration of the electronic apparatus 100 according to an embodiment of the disclosure.

Referring to FIG. 1, the electronic apparatus 100 may include a memory 110 and a processor 120.

The memory 110 may store at least one instruction or module used for operation of the electronic apparatus 100 or the processor 120. The instruction is a code unit that directs the operation of the electronic apparatus 100 or the processor 120, and may be written in a machine language that can be understood by a computer. A module may be an instruction set of a series of instructions that perform a particular task of a task unit.

Data, which may represent characters, numbers, images, etc., may be stored in the memory 110. For example, the memory 110 may store a first neural network model for identifying an active time and an inactive time of a user based on context information, and a second neural network model for obtaining a freezing probability for each time zone of the washing machine based on the operation information and the environment information of the washing machine.

The neural network model may include a plurality of neural network layers. Each of the layers includes a plurality of weight values, and may perform a neural network processing operation through an operation leveraging results of a previous layer and a plurality of weight values. Examples of a neural network includes convolutional neural network (CNN), deep neural network (DNN), recurrent neural network (RNN), restricted Boltzmann machine (RBM), deep belief network (DBN), bidirectional recurrent deep neural network (BRDNN), deep Q-networks, or the like. In the disclosure, various neural network may be used in addition to the neural network mentioned. The neural network model may be configured with an ontology-based data structure which is represented as a format in which various concepts, conditions, relations, or agreed-upon knowledge are represented as a format processible by computer.

The neural network model may be trained through a separate server and/or system or the electronic apparatus 100 using various learning algorithms. Learning algorithm is a method of training a predetermined target device (e.g., robot) using enough learning data so that the predetermined target device can make a decision or prediction by itself. Examples of learning algorithms include, but are not limited to, supervised learning, unsupervised learning, semi-supervised learning, or reinforcement learning, and various learning algorithms may be used.

The memory 110 may be accessed by the processor 120, and reading/writing/modifying/updating of data by the processor 120 may be performed associated with the instructions, modules, AI model or data.

The processor 120 may control overall operations of the electronic apparatus 100. The processor 120 may be connected to each configuration of the electronic apparatus 100 to control overall operations of the electronic apparatus 100. For example, the processor 120 may be connected to the memory 110, a communication interface (not shown), a display (not shown), or the like, for controlling the operation of the electronic apparatus 100.

The processor 120 according to an embodiment may be implemented with a digital signal processor (DSP), a microprocessor, and a time controller (TCON), or the like, but the processor is not limited thereto. The processor 120 may include, for example, and without limitation, one or more among a central processor (CPU), a micro controller unit (MCU), a microprocessor unit (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type which a processing algorithm is built therein, application specific integrated circuit (ASIC), or in a field programmable gate array (FPGA) type.

The processor 120 may obtain context information of a user, operation information of the washing machine, and environment information. For example, the electronic apparatus 100 may further include a communication interface, the processor 120 may receive the user's context information from the user terminal 300 via the communication interface, and receive operation information and environment information from the washing machine 200 via the communication interface.

The processor 120 may obtain context information of the user, operation information and environment information of the washing machine at predetermined time intervals. Alternatively, the processor 120 may obtain context information of the user, operation information and environment information of the washing machine at a predetermined time point. The processor 120 may obtain context information of the user, operation information of the washing machine, and environment information on the basis of the user's active time.

The context information may include at least one of a use history of the user terminal 300 or the washing machine 200 use history of the user, and the operation information may include at least one of inside temperature (e.g., inside temperature of 5 degrees or below) of the washing machine 200, washing time of the washing machine 200, washing temperature of the washing machine 200, or power consumption of the washing machine 200, and the environment information may include at least one of outside temperature information or external humidity information. The embodiment is not limited thereto and the context information may be any information if information related to the user is information, and the operation information may be any information if information related to the washing machine 200, and the environment information may be any information related to the surrounding environment of the washing machine 200. In particular, the environment information may include environment information at the current time point, as well as predicted environment information at the future time point.

The processor 120 may input the context information to the first neural network model to identify the active time and the inactive time of the user. Here, the first neural network model may be obtained by learning a relationship for the sample active time of the sample context information through a first artificial intelligence algorithm. For example, the sample context information indicating that the user's location is moving or the sample context information indicating that the TV is turned on is matched to the information of the active time, and the sample context information indicating that the user does not change the location of the user and that the TV is turned off is matched to the information of the inactive time, and the first neural network model may be obtained by learning the matched information through an artificial intelligence algorithm as described above. The sample context information may include various information related to the user.

The processor 120 may input the operation information and the environment information into the second neural network model if the current time point is within the active time, thereby obtaining a freezing probability for each time zone of the washing machine 200. For example, if the current time point is within the active time, the processor 120 may input the operation information and the environment information into the second neural network model to obtain a freezing probability of 10% of the washing machine 200 after one hour, obtain a freezing probability of 15% of the washing machine 200 after two hours, and obtain 20% of the freezing probability of the washing machine 200 after three hours. Here, the second neural network model may obtain by learning, through a second artificial intelligence algorithm, a relationship between the sample operation information and the sample environment information with respect to the freezing probability by time zones. The sample operation information and the sample environment information may include operation information and environment information of the washing machine in which a freezing error has not occurred, as well as operation information and environment information of the washing machine in which the freezing error has occurred. The first artificial intelligence algorithm and the second artificial intelligence algorithm may be same and/or similar artificial intelligence algorithms or may be different artificial intelligence algorithms.

The processor 120 may not perform the acquisition operation of the freezing probability for each time zone of the washing machine 200 when the current time point is within the inactive time. The embodiment is not limited thereto, and the processor 120 may input the operation information and the environment information into the second neural network model even if the current time point is within an inactive time, thereby obtaining a freezing probability for each time zone of the washing machine 200. In this case, the processor 120 may provide a freezing probability equal to or greater than a threshold freezing probability that will be described later after the user's active time is reached.

The processor 120 may identify a freezing probability that is greater than or equal to a threshold freezing probability during an active time and an inactive time during an acquired freezing probability for each time zone. For example, the processor 120 may identify a freezing probability that is at least 70% of the threshold freezing probability for the user's active time 14:00-24:00 and the inactive time 24:00-07:00.

The processor 120 may control the communication interface to send the identified freezing probability to the user terminal 300. The processor 120 may control the communication interface to transmit the identified freezing probability and corresponding time point information to the user terminal 300. In the above example, the processor 120 may control the communication interface to send a freezing probability of 72% of 06:00, and a freezing probability of 70% at 07:00, to the user terminal 300.

The processor 120 may identify a plurality of active times and a plurality of inactive times of the user by inputting the context information to the first neural network model, obtain one or more freezing probabilities by time zones of the washing machine 200 by inputting the operation information and the environment information to the second neural network model based on the current point in time being within one active time among the plurality of active times, and identify, among the obtained freezing probabilities by time zones, a freezing probability greater than or equal to the threshold freezing probability during the one active time and immediately after the one active time among the plurality of inactive times.

For example, the processor 120 may input context information into a first neural network model to identify a plurality of active times and a plurality of inactive times of the user. For example, the processor 120 may identify a user's active time of March 1, 14:00-24:00, inactive time of March 2, 24:00-07:00, active time of March 2, 07:00-15:00, and inactive time of March 2, 15:00-17:00. The processor 120 may acquire the freezing probability for each time zone of the washing machine 200 by inputting the operation information and the environment information into the second neural network model, and identify a freezing probability that is greater than or equal to a critical freezing probability for an active time of March 1, 14:00-24:00, and an inactive time of March 2, 24:00-07:00 during the acquired freezing probability for each time zone. Through this operation, freezing of the washing machine 200 which may occur at the user's inactive time may be prevented.

The processor 120 may input the operation information and the environment information into the second neural network model to obtain a freezing probability for each of the plurality of components included in the washing machine 200.

For example, the processor 120 may obtain a freezing probability of 10% of the washing tub of the washing machine 200, 8% of the freezing probability of the residual water hose, and 7% of the freezing probability of the drainage hose after one hour from inputting the operation information and the environment information into the second neural network model, obtain a freezing probability of 15% of the washing tub of the washing machine 200, the freezing probability of 10% of the remaining water hose, 9% of the freezing probability of the drainage hose after two hours and may obtain, and 13% of the freezing probability of the drainage hose after two hours and may obtain a freezing probability of 25% of the washing tub of the washing machine 200, the freezing probability of 15% of the remaining water hose, 13% of the freezing probability of the drainage hose after three hours. The second neural network model may obtain, by learning through an artificial intelligence algorithm, freezing probability relation between sample operation information, sample environment information, and each of the plurality of configurations included in the washing machine 200 by time zones.

The processor 120 may provide a freezing measure guide when a freezing probability that is greater than or equal to a first threshold freezing probability for an active time and an inactive time during an acquired time-to-time freezing probability is identified, and provide a freezing prevention guide when a freezing probability that is greater than or equal to a second threshold freezing probability and less than a first threshold freezing probability is identified during the acquired time-to-time freezing probability. The processor 120 may provide a communication interface to transmit a freezing measure guide or a freezing prevention guide to the user terminal 300.

The processor 120 may, based on a point in time after a threshold time from the current point in time being within the active time, re-obtain the context information, the operation information, and the environment information after the threshold time from the current point in time, re-identify the active time and the inactive time of the user by inputting the re-obtained context information to the first neural network model, based on a point in time after the threshold time from the current point in time being within the re-identified active time, re-obtain the one or more freezing probabilities by time zones of the washing machine by inputting the re-obtained operation information and the re-obtained environment information to the second neural network model, and identify a freezing probability greater than or equal to the threshold freezing probability during the re-identified active time and the re-identified inactive time among the re-obtained freezing probabilities by time zones. The processor 120 may perform identification operation of the freezing probability of the washing machine 200 in a preset time interval for the active time.

The processor 120 may, based on a point in time after a threshold time from the current point in time not being within the active time, re-obtain the context information, the operation information, and the environment information at a point in time when the active time ends, re-identify the active time and the inactive time of the user by inputting the re-obtained context information to the first neural network model, based on a point in time when the active time ends being within the re-identified active time, re-obtain the one or more freezing probabilities by time zones of the washing machine by inputting the re-obtained operation information and the re-obtained environment information to the second neural network model, and identify a freezing probability greater than or equal to the threshold freezing probability during the re-identified active time and the re-identified inactive time among the re-obtained one or more freezing probabilities by time zones. The processor 120 may perform an identification operation of the freezing probability of the washing machine 200 at a predetermined period of time while the user is in an active time, and may additionally perform an identification operation of the freezing probability of the washing machine 200 at a time when a predetermined time period expires.

It has been described that the electronic apparatus 100 is a separate device from the washing machine 200, but the embodiment is not limited thereto. For example, the electronic apparatus 100 is a washing machine 200, and further includes a communication interface and a sensor, the processor 120 may receive context information of a user from the user terminal 300 through a communication interface, obtain operation information from the memory 110, obtain environment information through the sensor, and may control the communication interface to transmit the identified freezing probability to the user terminal 300.

The electronic apparatus 100 may be a user terminal. For example, the electronic apparatus 100 is a user terminal 300, and further includes a communication interface and a display, and the processor 120 may obtain context information of a user from the memory 110, receive operation information and environment information from the washing machine 200 via the communication interface, and control the display to display the identified freezing probability.

It has been described that the first neural network model and the second neural network model are divided, but the embodiment is not limited thereto. For example, the first neural network model and the second neural network model may be implemented as one integrated neural network model. In this case, the integrated neural network model may obtain, by learning through an artificial intelligence algorithm, freezing probability relationship for each time zone of each of the active time and inactive time of the user with respect to sample context information, sample operation information, sample environment information.

Figure 3:
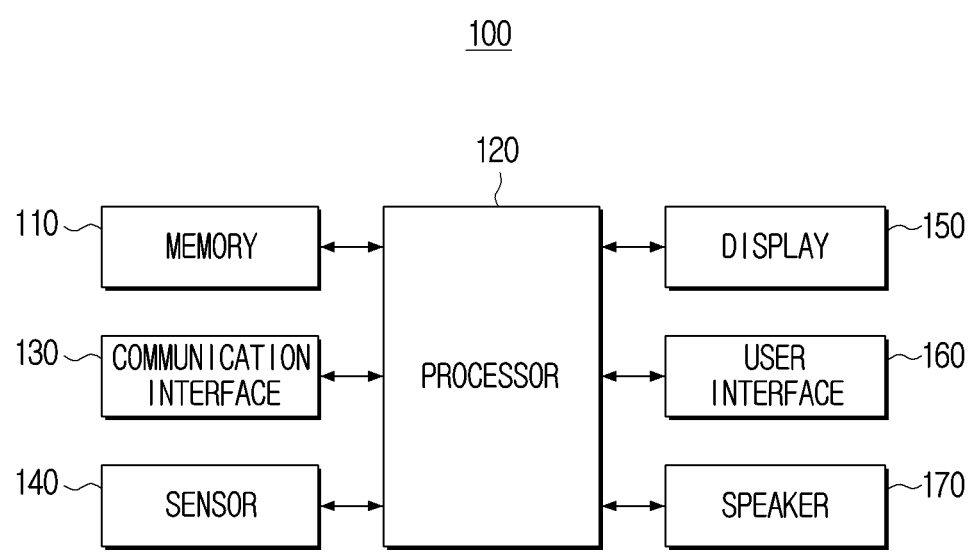
FIG. 3 is a block diagram illustrating a detailed configuration of an electronic apparatus according to an embodiment of the disclosure.

FIG. 3 is a block diagram of the electronic apparatus 100 according to an embodiment of the disclosure. The electronic apparatus 100 may include a memory 110 and a processor 120. Referring to FIG. 3, the electronic apparatus 100 may further include a communication interface 130, a sensor 140, a display 150, a user interface 160, and a speaker 170. In FIG. 3, a detailed description thereof will be omitted for the overlapped portion of the components shown in FIG. 2.

The communication interface 130 is configured to communicate with various types of external devices according to various types of communication methods. For example, the electronic apparatus 100 may communicate with a server through the communication interface 130.

The communication interface 130 may include a Wi-Fi module, a Bluetooth module, an infrared communication module, a wireless communication module, or the like. Each communication module may be implemented as at least one hardware chip.

The Wi-Fi module and the Bluetooth module perform wireless communication using Wi-Fi method and Bluetooth protocols, respectively. When using the Wi-Fi module or the Bluetooth module, various connection information such as a service set identifier (SSID) and a session key may be transmitted and received to establish a communication session, and communication information may be transmitted after a communication connection is established. The infrared ray communication module performs communication according to infrared data association (IrDA) technology that transmits data wireless to local area using infrared ray between visible rays and millimeter waves.

The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), 4th generation (4G), $5^{th}$ generation (5G), or the like, in addition to the communication modes described above.

The communication interface 130 may include wired communication interface such as high-definition multimedia interface (HDMI), display port (DP), Thunderbolt, universal serial bus (USB), red, green, and blue (RGB) port, d-subminiature (D-SUB), digital visual interface (DVI), and the like.

The communication interface 130 may also include at least one of a local area network (LAN) module, Ethernet module, or wired communication module performing communication using a pair cable, a coaxial cable, an optical cable, or the.

The sensor 140 may be provided when the electronic apparatus 100 is a washing machine 200, and may include at least one of a temperature sensor or a humidity sensor for sensing temperature, humidity, and the like around the electronic apparatus 100. The embodiment is not limited thereto, and the sensor 140 may be any configuration capable of sensing environment information around the electronic apparatus 100.

The display 150 may be implemented as various types of displays such as a liquid crystal display (LCD) panel, organic light emitting diodes (OLED) display panel, a plasma display panel (PDP), and the like. In the display 150, a driving circuit of the display panel can be implemented using an a-Si thin film transistor (TFT), a low temperature poly silicon (LTPS) TFT, an organic TFT (OTFT), and a backlight unit. Further, the display 150 may be implemented as a touch screen coupled with a touch sensor, a flexible display, a three-dimensional (3D) display, or the like.

The user interface 160 may be implemented as a button, a touch pad, a mouse, and a keyboard, or implemented as a touch screen which is capable of performing the display function and a manipulation input function as well. The button may be various types of buttons such as a mechanical button, a touch pad, a wheel, and the like formed in an arbitrary area such as a front surface portion, a side surface portion, and a back surface portion of the main body of the electronic apparatus 100.

The speaker 170 is configured to output various audio data, various alarm sounds, a voice message, or the like, which are processed by the processor 120.

Through the above-described operation of the washing machine 200, the electronic apparatus 100 may provide a freezing alarm having a high accuracy by comprehensively considering the operation information and the environment information of the washing machine 200, and may predict the freezing of the washing machine 200 in consideration of the active time of the user and the inactive time, and thus, even if there is a possibility that the washing machine 200 is frozen, it is possible to take a preemptive action for the washing machine 200.

The operation of the electronic apparatus 100 will be described in more detail with reference to FIGS. 4 to 16. In particular, in FIGS. 4 to 16, an exemplary embodiment will be described. However, the individual embodiments of FIGS. 4 to 16 may be implemented in a combined state.

Figure 4:
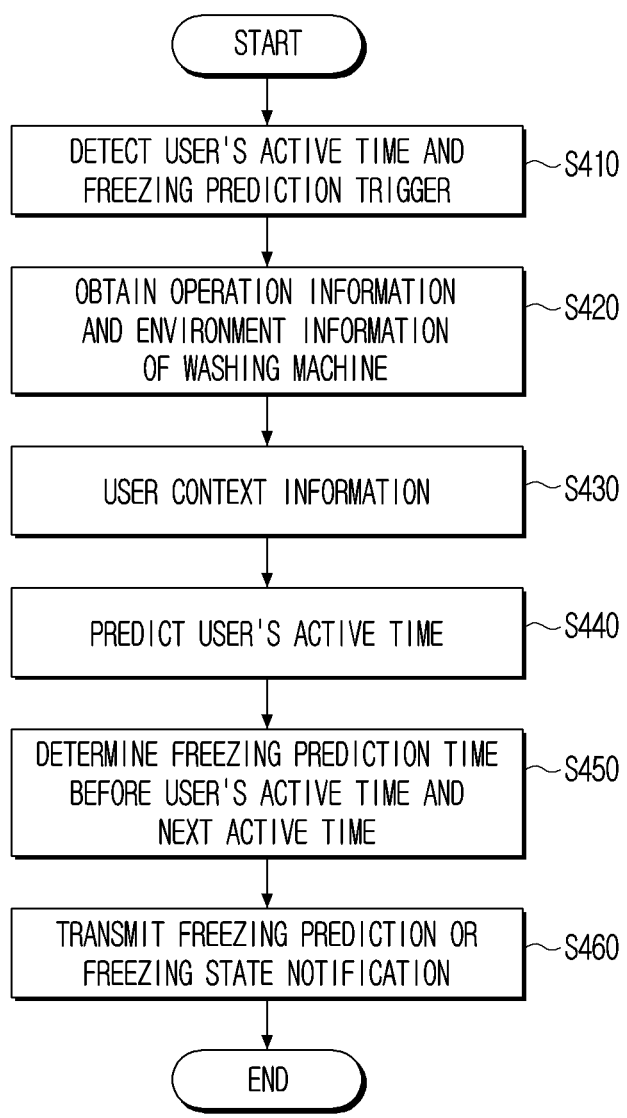
FIG. 4 is a flowchart illustrating a method for predicting freezing according to an embodiment of the disclosure.

FIG. 4 is a flowchart illustrating a method for predicting freezing according to an embodiment of the disclosure.

The processor 120 may identify whether a user active time detection and a freezing prediction trigger has occurred in operation S410. For example, the processor 120 may sense an active time of a user (to be described later) and perform a freezing prediction operation when a predetermined event occurs, such as when a predetermined point of time nears or there is a user command.

In operation S430, the processor 120 may obtain operation information and environment information of the washing machine 200 in operation S420, and obtain context information of the user. The environment information of the washing machine 200 may be information in which the washing machine 200 senses surrounding environment information, or may be information stored in a weather server.

The processor 120 may predict the user active time based on the context information in operation S440. For example, the processor 120 may enter context information into the first neural network model to identify the user's active time and inactive time. In this case, the processor 120 may identify whether a user is active at a time point after a predetermined time as well as a current time point.

The processor 120 may determine a freezing prediction time until the user's active time and the next active time in operation S450, and may transmit a freezing prediction or a freezing state alarm in operation S460.

Figure 5:
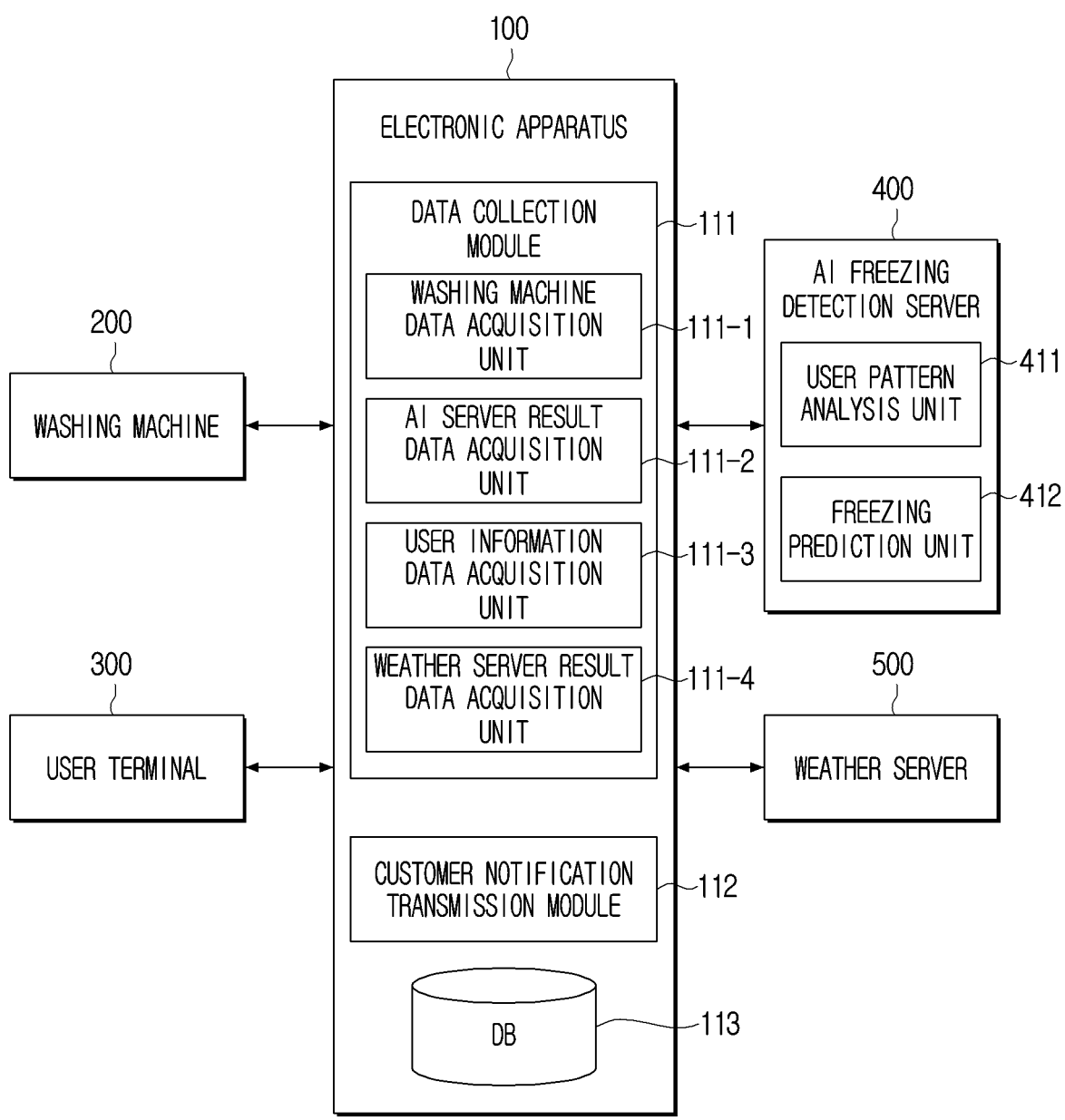
FIG. 5 is a diagram illustrating operations of an electronic apparatus and a plurality of servers according to an embodiment of the disclosure.

FIG. 5 is a diagram illustrating operations of the electronic apparatus 100 and a plurality of servers according to an embodiment of the disclosure.

Although FIG. 1 to FIG. 4 illustrate that the electronic apparatus 100 performs a freezing prediction operation as one configuration, the electronic apparatus 100 may be divided into a plurality of configurations. For example, as shown in FIG. 5, the electronic apparatus 100 and the plurality of servers may perform a freezing prediction operation.

First, the electronic apparatus 100 may store a data collection module 111, a customer notification transmission module 112, and database 113. The data collection module 111 may include a washing machine data acquisition unit 111-1, an AI server result data acquisition unit 111-2, a user information data acquisition unit 111-3, and a weather server result data acquisition unit 111-4.

The washing machine data acquisition unit 111-1 may receive operation information from the washing machine 200, the user information data acquisition unit 111-3 may receive the user's context information from the user terminal 300, and the weather server result data acquisition unit 111-4 may receive environment information from the weather server 500. The database 113 may include registration information of the washing machine 200 and the user terminal 300, operation information obtained from the washing machine 200, context information obtained from the user terminal 300, and environment information obtained from the weather server 500.

The electronic apparatus 100 may transmit the information included in the database 113 to the AI freezing detection server 400.

The AI freezing detection server 400 may store the user pattern analysis unit 411 and the freezing prediction unit 412. The user pattern analyzer 411 may identify whether the user is active based on the context information received from the electronic apparatus 100. If the current time point is within the active time of the user, the freezing prediction unit 412 may obtain the freezing probability for each time zone of the washing machine 200 based on the operation information and the environment information received from the electronic apparatus 100. The AI freezing detection server 400 may transmit the freezing probability of the washing machine 200 by time zones to the electronic apparatus 100.

The AI server result data acquisition unit 111-2 of the electronic apparatus 100 may obtain a freezing probability for each time zone of the washing machine 200 from the AI freezing detection server 400, and identify a freezing probability that is equal to or greater than a threshold freezing probability for a user's active time and an inactive time of the freezing probability for each time zone.

The customer notification transmission module 112 may transmit the freezing probability which is greater than or equal to the threshold freezing probability to the user terminal 300.

Figure 6:
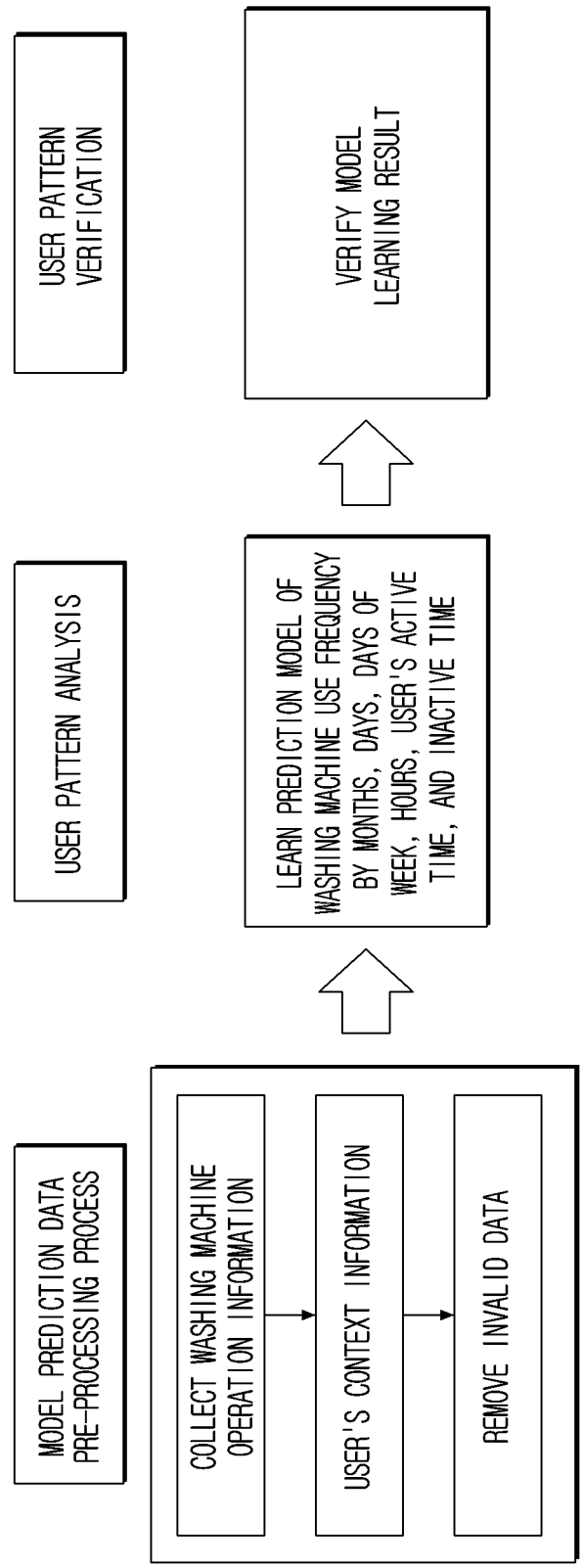
FIG. 6 is a diagram illustrating a first neural network model according to an embodiment of the disclosure.

FIG. 6 is a diagram illustrating a first neural network model according to an embodiment of the disclosure.

The external server may obtain a first neural network model through an artificial intelligence algorithm and provide the obtained first neural network model to the electronic apparatus 100. However, the embodiment is not limited thereto and the electronic apparatus 100 may obtain a first neural network model through an artificial intelligence algorithm. Hereinafter, for convenience, it will be described that an external server obtains a first neural network model.

The external server may collect operation information of the washing machine 200 and obtain the user's context information from the operation information of the washing machine 200. For example, the external server may obtain information on the activity of the user based on the operation time of the washing machine 200, whether the door is opened or closed, and the like. The external server may remove invalid data.

The external server may obtain a first neural network model by learning, from the context information of the user from which invalid data has been removed, the frequency of use of the washing machine 200 for month, day, day of a week, time, the active time of the user, and the inactive time prediction model.

The external server may verify a learning result of the first neural network model through additional data. Alternatively, the external server may perform a freezing prediction through the first neural network model, and may verify a learning result by comparing to the actual freezing.

As described above, the external server may obtain the first neural network model without receiving the context information of the user from the user terminal 300. In this case, the electronic apparatus 100 may not receive the user's context information from the user terminal 300 and may finally provide the identified freezing probability to the washing machine 200. The washing machine 200 may display the freezing notification through the display 150 or may output the notification as a sound through the speaker 170.

The external server may receive the user's context information from the user terminal 300 and learn the first neural network model using the context information.

Figure 7:
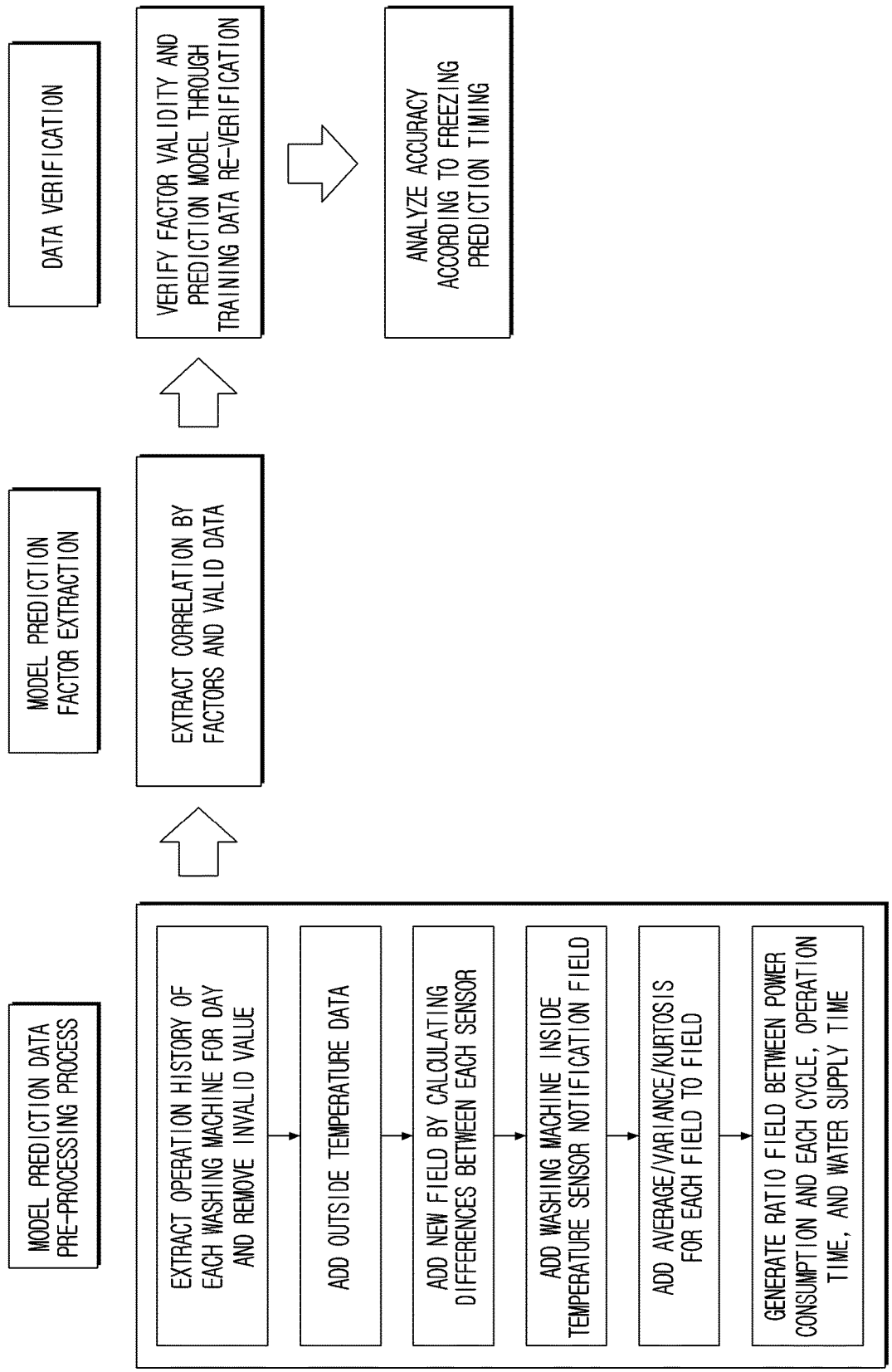
Figure 9:
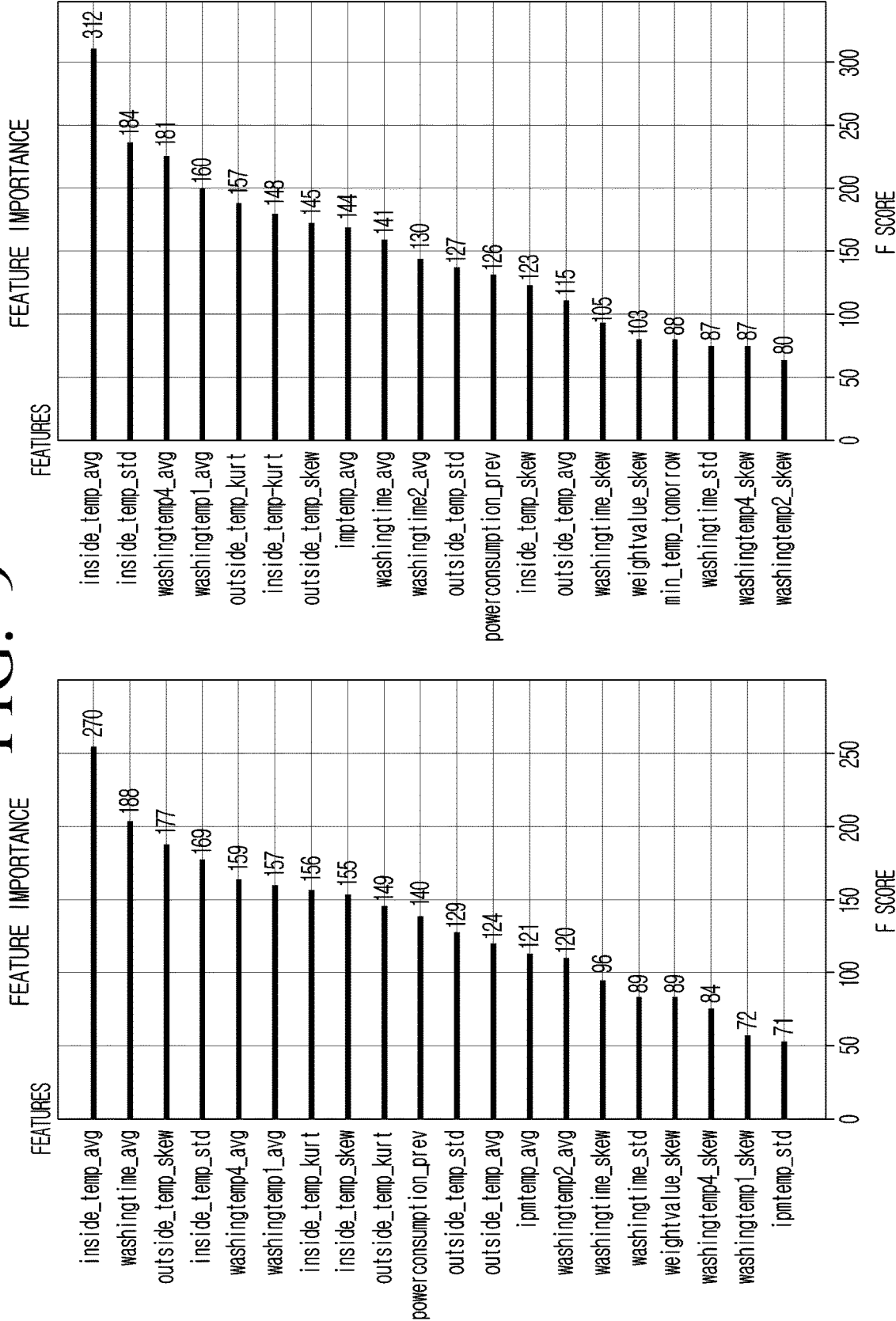

FIGS. 7 to 9 are diagrams illustrating learning of a second neural network model according to an embodiment of the disclosure.

The external server may pre-process data to be used for learning of the second neural network model. For example, each washing machine may output factor data as shown in FIG. 8 after one operation. The external server may generate a plurality of fields by extracting an operation history for each washing machine and remove an invalid value. The external server may add the outside temperature data, calculate a difference between each sensor, add a new field, and add an inside temperature sensor notification field to the washing machine. In addition, the external server may add average/variance/kurtosis for each field to a field, and generate a ratio between power consumption and each cycle, operation time, and water supply time as a field.

The external server may extract a factor to be used for learning of the second neural network model. For example, as shown in FIG. 9, the external server may extract the correlation and validity data for each factor through the search data analysis and learn the second neural network model based on the extracted factors. The external server may extract the most meaningful factors in which the freezing error occurs using a portion of the data, such as 70% data, and use the remaining 30% data in the verification process.

The external server may verify the factor validity and prediction model through training data re-verification, and analyze the accuracy in accordance with the freezing prediction time.

Figure 10:
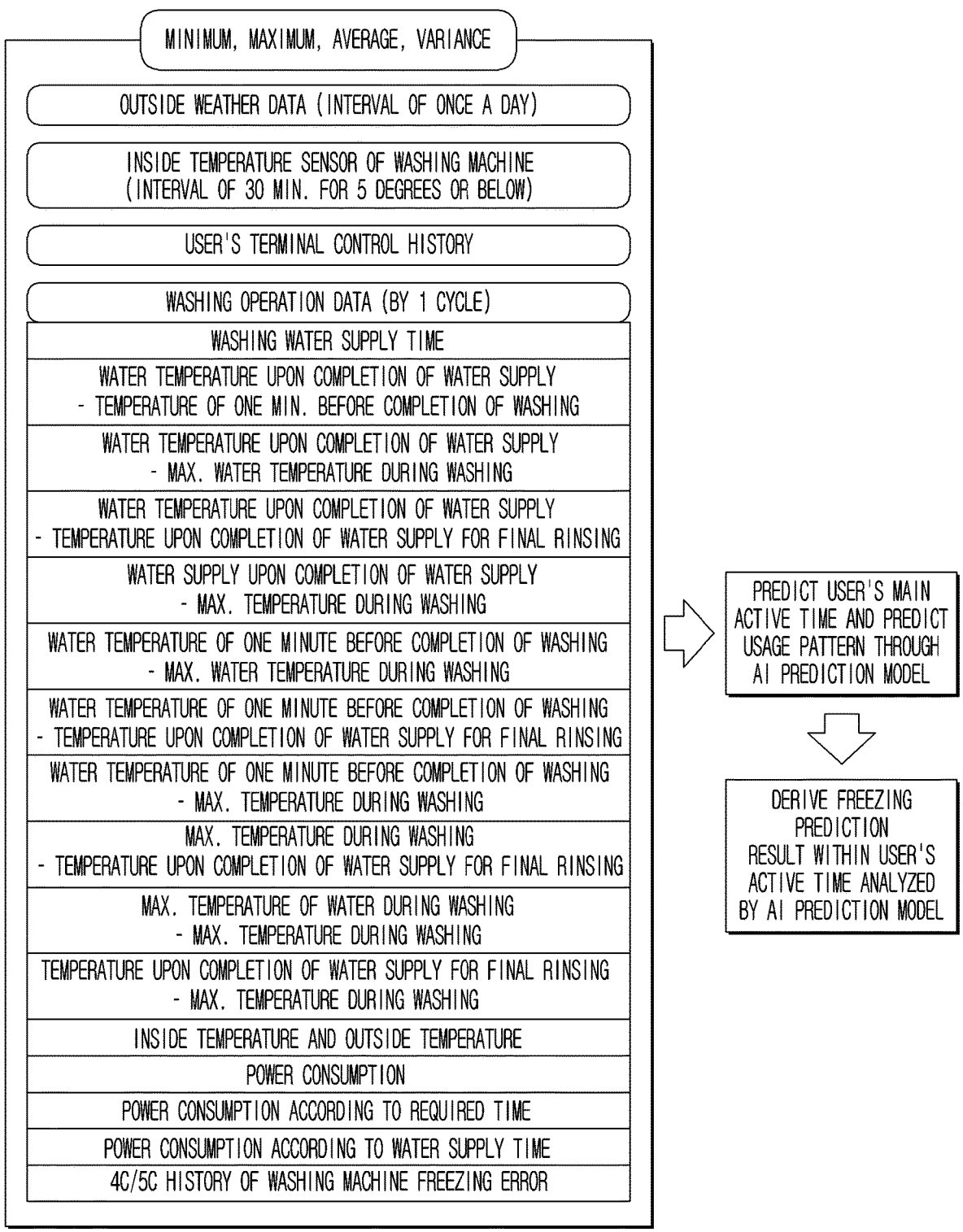
FIG. 10 is a diagram illustrating a freezing prediction process in detail, according to an embodiment of the disclosure.

FIG. 10 is a diagram illustrating a freezing prediction process in detail, according to an embodiment of the disclosure.

The processor 120 may obtain external weather data as environment information. For example, the processor 120 may receive external weather data from an external weather server at an interval of once a day. Alternatively, the processor 120 may receive the temperature around the washing machine 200 at an interval of once a day from the washing machine 200.

The processor 120 may receive inside temperature sensor data of the washing machine 200. For example, if the inside temperature of the washing machine 200 is 5° or less, the washing machine 200 may transmit the temperature sensor data to the electronic apparatus 100 at intervals of 30 minutes.

The processor 120 may receive the control history of the user terminal 300 from the user terminal. The processor 120 may store the control history of the user terminal 300 in the memory 110 as the context information of the user.

The processor 120 may obtain laundry operation data. For example, the washing machine 200 may transmit laundry operation data to the electronic apparatus 100 for each single operation. Here, the laundry operation data may include the laundry water feed time, the water temperature when the laundry water is completed, the water temperature when the water supply is completed, the water temperature 1 minute before the end of washing, the maximum water temperature during washing, the temperature at the completion of the final rinsing water supply, the room temperature, the outdoor temperature, the amount of power consumed, the freezing error history, and the like.

The processor 120 may predict the user's main active time and predict usage patterns based on the received data as described above. The processor 120 may obtain a freezing prediction result within the user's active time to provide real-time notifications to the user. The processor 120 may obtain a freezing prediction result within the user's inactive time to provide a preventive notification to the user.

Figure 11:
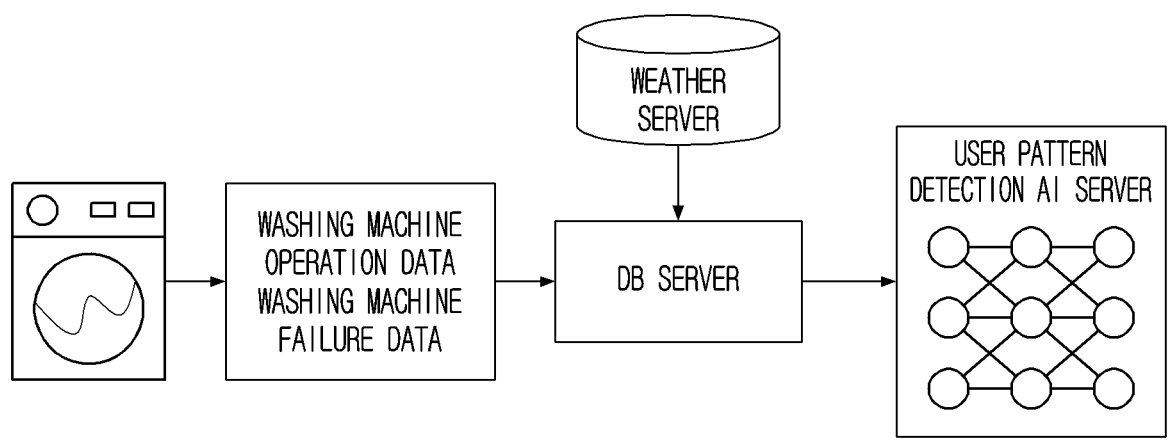
FIG. 11 is a diagram illustrating an operation of a pattern detection artificial intelligence (AI) server according to an embodiment of the disclosure.

FIG. 11 is a diagram illustrating an operation of a pattern detection artificial intelligence (AI) server according to an embodiment of the disclosure.

The database (DB) server may receive washing machine operation data and washing machine failure data from the washing machine 200 and receive environment information from the weather server, and provide the received information to the user pattern detection AI server.

The user pattern detection AI server may identify whether the user is in an active state based on the received information.

Figure 12:
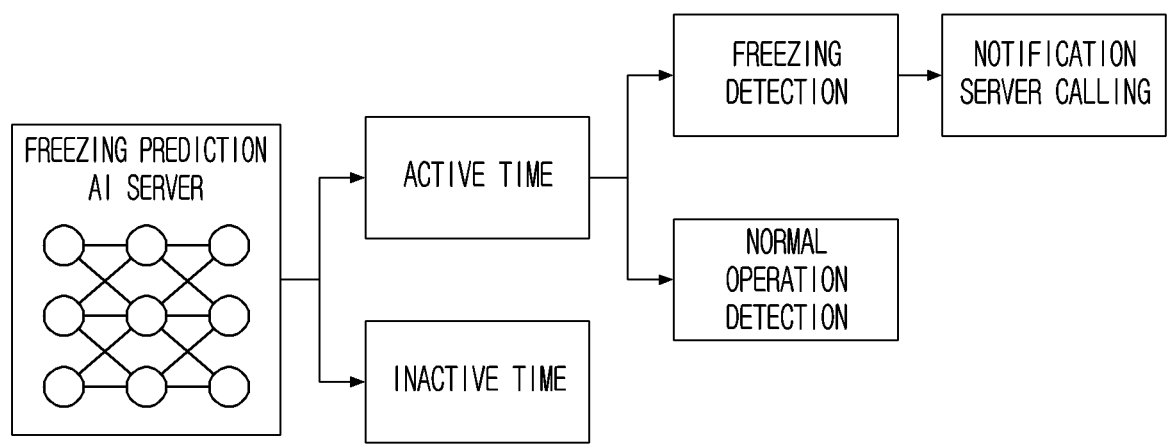
FIG. 12 is a diagram illustrating a freezing prediction AI server according to an embodiment of the disclosure.

FIG. 12 is a diagram illustrating a freezing prediction AI server according to an embodiment of the disclosure.

The freezing prediction AI server may obtain information on the active time and the inactive time of the user, and perform a freezing prediction operation when the current time point is within the active time of the user.

As a result of performing a freezing prediction operation by the freezing prediction AI server, the freezing prediction AI server may call the notification server when the freezing is detected, and may not perform any operation if it is detected that freezing is a normal operation.

FIGS. 11 and 12 are merely exemplary and are not limited thereto. For example, the electronic apparatus 100 may perform all the operations performed in FIGS. 11 and 12.

Figure 13:
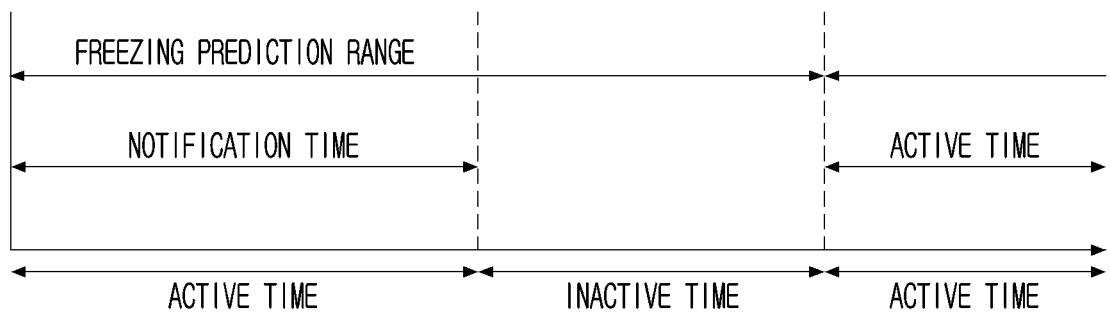
FIG. 13 is a diagram illustrating a prediction time according to an embodiment of the disclosure.

FIG. 13 is a diagram illustrating a prediction time according to an embodiment of the disclosure.

The processor 120 may predict the freezing of the washing machine 200 at the future time as well as the current time point. The processor 120 may predict the freezing of the washing machine 200 up to the active time of the user including the minimum current time and the inactive time immediately after the active time.

For example, as shown in FIG. 13, the processor 120 may predict freezing of the washing machine 200 up to an active time of the left and an inactive time of the center, and transmit a prediction result to the user terminal 300 within a notification time on the left.

However, this is the minimum time for the processor 120 to perform the freezing prediction, and the processor 120 may perform the freezing prediction for another time.

Figure 14:
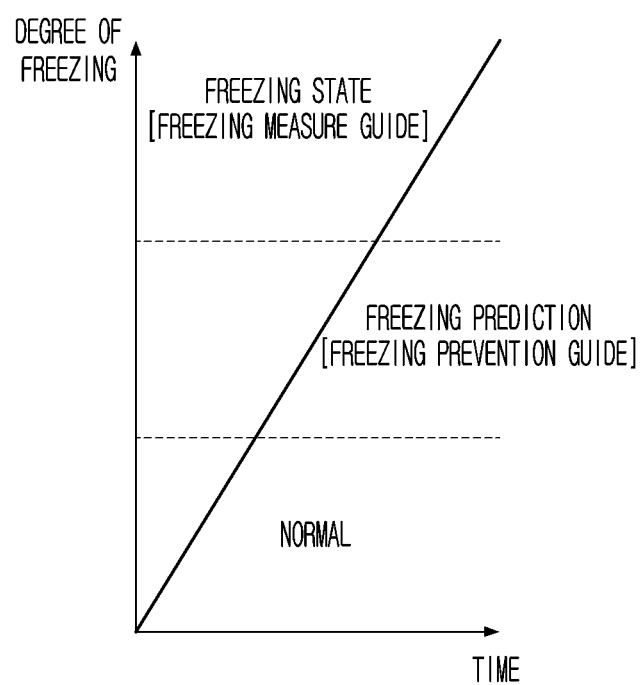
FIGS. 14 to 16 are diagrams illustrating a method of providing various notifications according to an embodiment of the disclosure.
Figure 15:
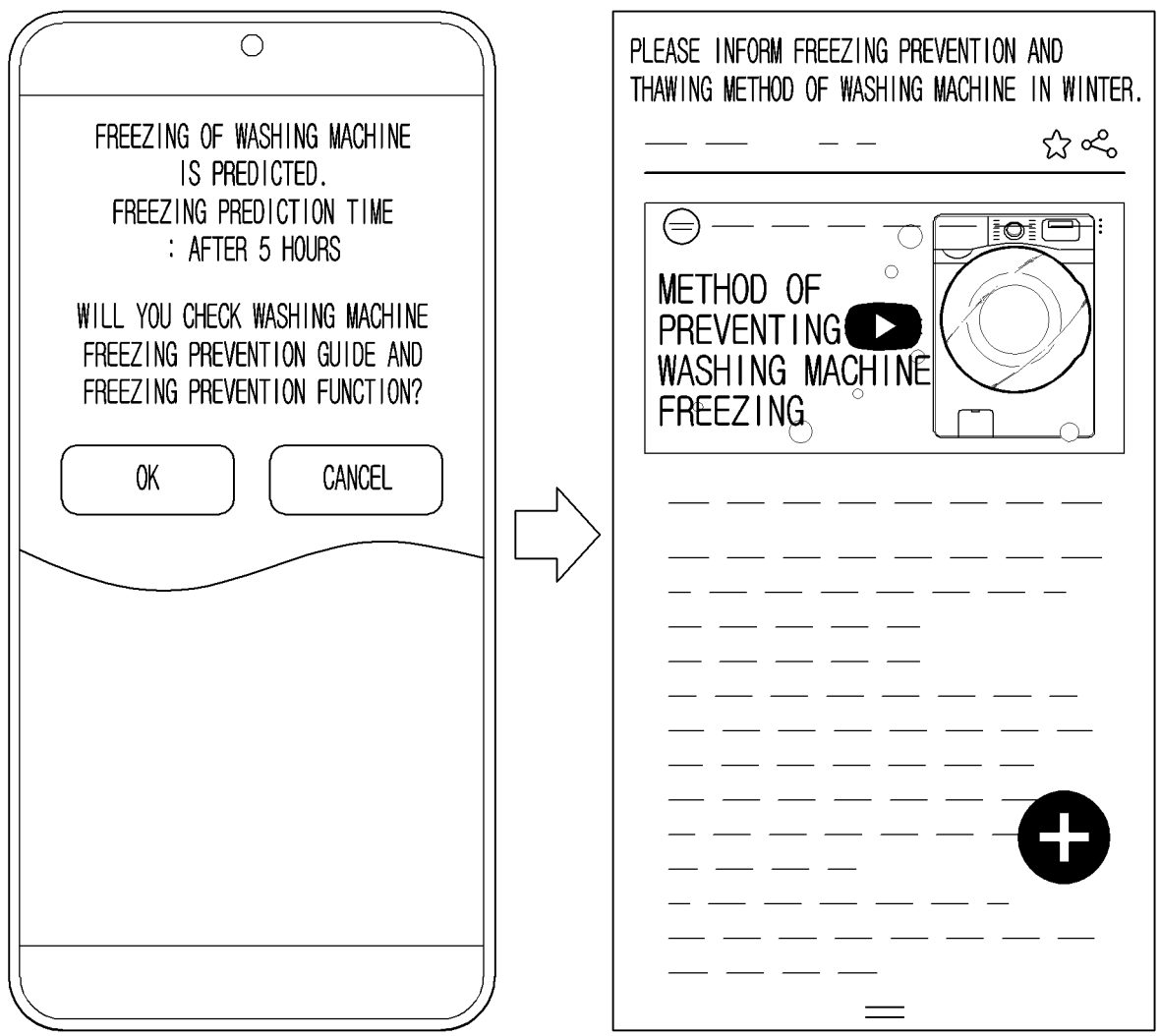
Figure 16:
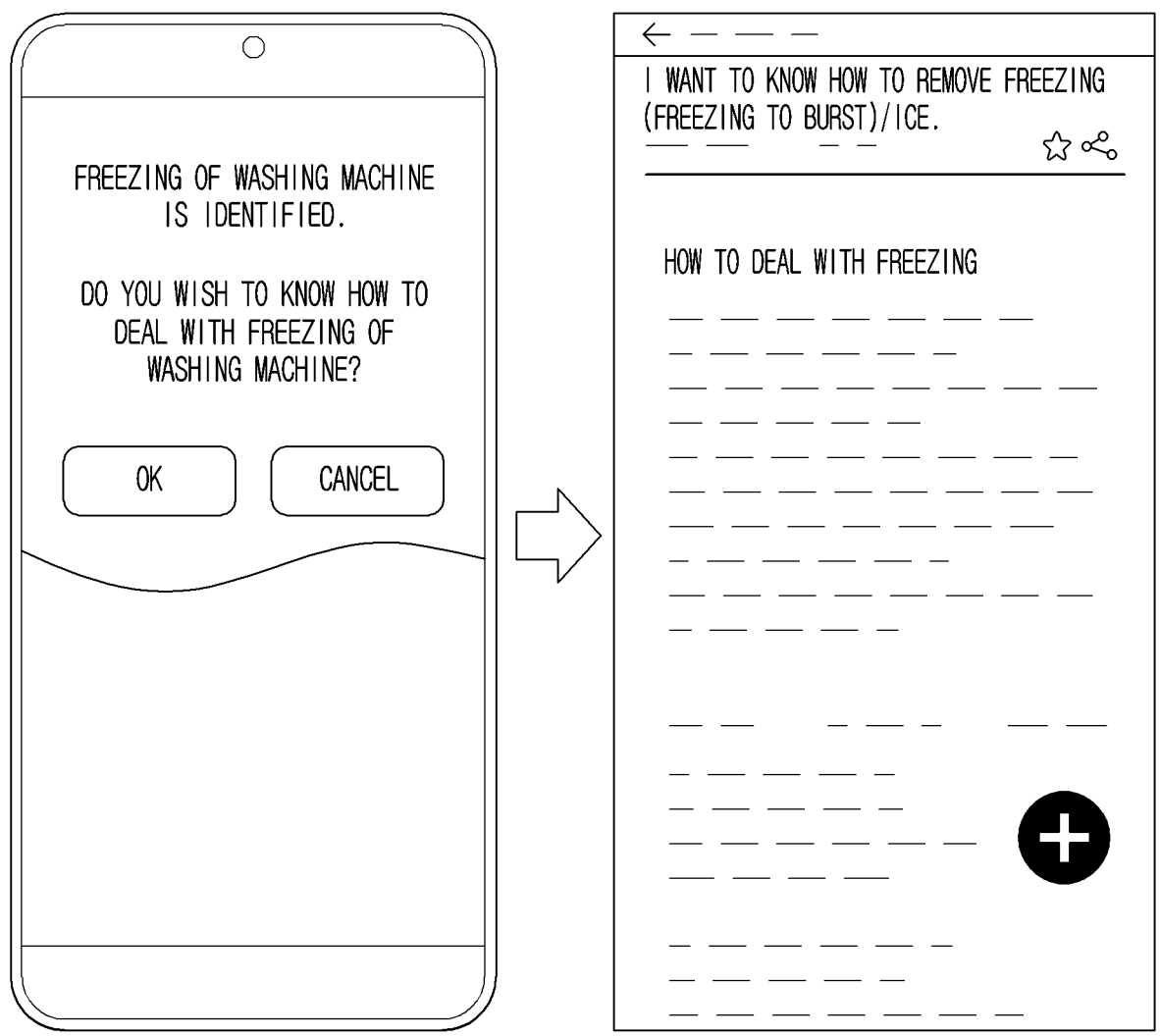

FIGS. 14 to 16 are diagrams illustrating a method of providing various notifications according to an embodiment of the disclosure.

The processor 120 may predict that the washing machine 200 may be frozen or may identify that the washing machine 200 is already in a freezing state. For example, as shown in FIG. 14, the processor 120 may identify that there is a freezing possibility if the first threshold time of the washing machine 200 in a normal state elapses over time as the degree of freezing increases, and may identify that the freezing occurs after second threshold time has elapsed after the first threshold time.

As illustrated in FIG. 15, the processor 120 may, based on identifying the freezing probability, provide a freezing measure guide. For example, the processor 120 may obtain the freezing probabilities by time zones, and based on identifying the freezing probability greater than or equal to a second threshold freezing probability and less than the first threshold freezing probability during the active time and the inactive time, among the obtained freezing probabilities by time zones, provide a freezing prevention guide.

Alternatively, the processor 120 may provide a freezing measure guide when identified as being frozen, as shown in FIG. 16. For example, the processor 120 may provide a freezing action guide when a freezing probability that is greater than or equal to a first threshold freezing probability during an active time and an inactive time during a freezing probability for each time zone is identified.

The processor 120 may provide a freezing prevention guide or a freezing action guide to the user terminal 300, and the user terminal 300 may display the freezing prevention guide or the freezing action guide through the display.

The processor 120 may provide the freezing prevention guide or the freezing action guide to the washing machine 200, and the washing machine 200 may display the freezing prevention guide or the freezing action guide through the display or may output the same as the sound through the speaker.

Figure 17:
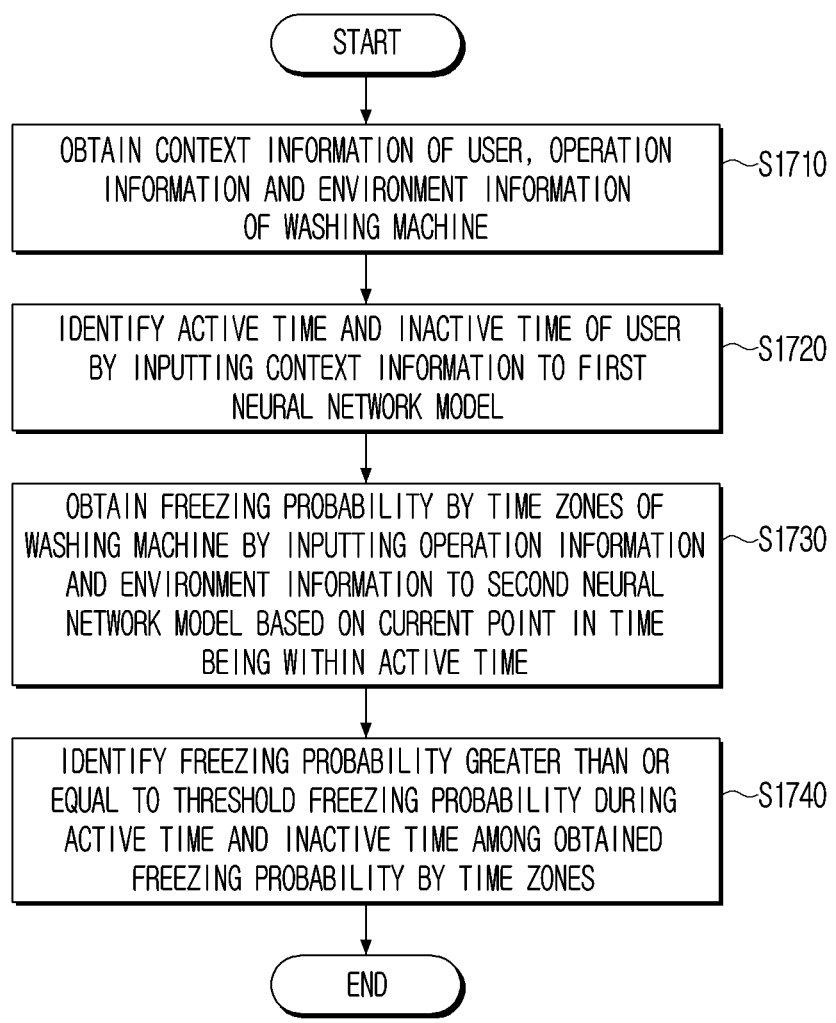
FIG. 17 is a flowchart illustrating a method of controlling an electronic apparatus according to an embodiment of the disclosure.

FIG. 17 is a flowchart illustrating a method of controlling an electronic apparatus according to an embodiment of the disclosure.

First, context information of a user, operation information and environment information of the washing machine are obtained in operation S1710. The active time and the inactive time of the user are identified by inputting the context information to the first neural network model in operation S1720. One or more freezing probabilities by time zones of the washing machine is obtained by inputting the operation information and the environment information to the second neural network model based on a current point in time being within the active time in operation S1730. A freezing probability greater than or equal to a threshold freezing probability during the active time and the inactive time among the obtained freezing probabilities by time zones is identified in operation S1740.

The obtaining the context information, the operation information, and the environment information in operation S1710 may include receiving the context information of the user from a user terminal and receiving the operation information and the environment information from the washing machine, and the controlling method may further include transmitting the identified freezing probability to the user terminal.

The obtaining of the one or more freezing probabilities by time zones in operation S1730 may include obtaining a freezing probability or probabilities by time zones for each of a plurality of configurations included in the washing machine by inputting the operation information and the environment information to the second neural network model.

The identifying a freezing probability greater than or equal to a threshold freezing probability in operation S1740 may include, based on identifying the freezing probability greater than or equal to a first threshold freezing probability during the active time and the inactive time, among the obtained freezing probabilities by time zones, providing a freezing measure guide, and based on identifying the freezing probability greater than or equal to a second threshold freezing probability and less than the first threshold freezing probability during the active time and the inactive time, among the obtained freezing probabilities by time zones, providing a freezing prevention guide.

The method may further include, based on a point in time after a threshold time from the current point in time being within the active time, re-obtaining the context information, the operation information, and the environment information after a threshold time from the current point in time, re-identifying the active time and the inactive time of the user by inputting the re-obtained context information to the first neural network model, based on a point in time after a threshold time from the current point in time being within the re-identified active time, re-obtaining the freezing probability or probabilities by time zones of the washing machine by inputting the re-obtained operation information and the re-obtained environment information to the second neural network model, and identifying a freezing probability greater than or equal to the threshold freezing probability during the re-identified active time and the re-identified inactive time among the re-obtained freezing probabilities by time zones.

The method may further include, based on a point in time after a threshold time from the current point in time not being within the active time, re-obtaining the context information, the operation information, and the environment information at a point in time when the active time ends, re-identifying the active time and the inactive time of the user by inputting the re-obtained context information to the first neural network model, based on a point in time when the active time ends being within the re-identified active time, re-obtaining the freezing probability or probability by time zones of the washing machine by inputting the re-obtained operation information and the re-obtained environment information to the second neural network model, and identifying a freezing probability greater than or equal to the threshold freezing probability during the re-identified active time and the re-identified inactive time among the re-obtained freezing probabilities by time zones.

The context information may include at least one of a use history of the user terminal or the washing machine use history of the user, and the operation information may include at least one of inside temperature.

The identifying the active time and inactive time in operation S1720 may include identifying a plurality of active times and a plurality of inactive times by inputting context information to the first neural network model and the obtaining the freezing probability or probabilities by time zones in operation S1730 may include obtaining a freezing probability or probabilities by time zones of the washing machine by inputting the operation information and the environment information to the second neural network model based on the current point in time being within one active time among a plurality of active times, and identifying a freezing probability greater than the threshold freezing probability in operation S1740 may include identifying, among the obtained freezing probability or probabilities by time zones, a freezing probability greater than or equal to the threshold freezing probability during the one active time and immediately after the one active time among the plurality of inactive time.

The first neural network model may be obtained by learning a relationship of sample context information with respect to a sample active time through an artificial intelligence algorithm, and the second neural network model may be obtained by learning a relationship of sample operation information with respect to a sample environment information by time zones through an artificial intelligence algorithm.

The electronic apparatus may be the washing machine, and the obtaining the context information, the operation information, and the environment information in operation S1710 may include receiving the context information of the user from a user terminal and receiving the operation information and the environment information from the washing machine, and the controlling method may further include transmitting the identified freezing probability to the user terminal.

The electronic apparatus may be the user terminal, and the obtaining the context information, the operation information, and the environment information in operation S1710 may include receiving the context information of the user from a memory of the electronic apparatus and receiving the operation information and the environment information from the washing machine, and the controlling method may further include displaying the identified freezing probability.

According to various embodiments of the disclosure, the electronic apparatus may provide a freezing alarm with a high accuracy by obtaining a freezing probability for each time zone of the washing machine in consideration of the operation information and the environment information of the washing machine.

Since the electronic apparatus predicts the freezing of the washing machine in consideration of the active time of the user as well as the inactive time, it is possible to take actions even if the washing machine is likely to be frozen.

Meanwhile, various embodiments of the disclosure may be implemented in software, including instructions stored on machine-readable storage media readable by a machine (e.g., a computer). An apparatus may call instructions from the storage medium, and execute the called instruction, including a drying apparatus (for example, drying apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

The above-described various embodiments may be implemented in a computer- or similar device-readable recording medium using software, hardware, or a combination thereof. In some embodiments, the embodiments described herein may be implemented by the processor itself. Through the software implementation, the embodiments such as a procedure and function described herein may be implemented with separate software modules. The software modules may perform one or more functions and operations described herein.

Computer instructions for performing the processing operations of a device according to various embodiments described above may be stored in a non-transitory computer-readable medium. The computer instructions stored in the non-transitory computer-readable medium, when executed by a processor of a particular device, may cause a particular device to perform processing operation in the device according to the various embodiments described above. A non-transitory computer-readable medium refers to a medium that stores data semi-permanently, rather than a medium that stores data for a short time, such as a register, cache, memory, etc., and is capable of being read by a device. A specific example of a non-transitory computer-readable medium may be a compact disc (CD), a digital versatile disc (DVD), a hard disk, a Blu-ray disc, a universal serial bus (USB), a memory card, a read only memory (ROM), and the like.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a memory storing a first neural network model and a second neural network model; and
a processor connected to the memory configured to control the electronic apparatus, wherein the processor is configured to:
obtain context information of a user, operation information of a washing machine, and environment information of the washing machine,
identify an active time of the user and an inactive time of the user by inputting the context information into the first neural network model,
obtain one or more freezing probabilities by time zones of the washing machine by inputting the operation information and the environment information to the second neural network model based on a current point in time being within the active time, and
identify a freezing probability greater than or equal to a threshold freezing probability during the active time and the inactive time based on the obtained one or more freezing probabilities by time zones.

2. The electronic apparatus of claim 1, further comprising:
a communication interface,
wherein the processor is further configured to:
receive the context information of the user from a user terminal through the communication interface,
receive the operation information and the environment information from the washing machine through the communication interface, and
control the communication interface to transmit the identified freezing probability to the user terminal.

3. The electronic apparatus of claim 1, wherein the processor is further configured to obtain the one or more freezing probabilities by time zones for each of a plurality of configurations included in the washing machine by inputting the operation information and the environment information to the second neural network model.

4. The electronic apparatus of claim 1, wherein the processor is further configured to:
based on identifying the freezing probability greater than or equal to a first threshold freezing probability during the active time and the inactive time, among the obtained one or more freezing probabilities by time zones, provide a freezing measure guide, and
based on identifying the freezing probability greater than or equal to a second threshold freezing probability and less than the first threshold freezing probability during the active time and the inactive time, among the obtained one or more freezing probabilities by time zones, provide a freezing prevention guide.

5. The electronic apparatus of claim 1, wherein the processor is further configured to:
based on a point in time after a threshold time from the current point in time being within the active time, re-obtain the context information, the operation information, and the environment information after the threshold time from the current point in time,
re-identify the active time and the inactive time of the user by inputting the re-obtained context information to the first neural network model,
based on a point in time after the threshold time from the current point in time being within the re-identified active time, re-obtain the one or more freezing probabilities by time zones of the washing machine by inputting the re-obtained operation information and the re-obtained environment information to the second neural network model, and
identify a second freezing probability greater than or equal to the threshold freezing probability during the re-identified active time and the re-identified inactive time among the re-obtained one or more freezing probabilities by time zones.

6. The electronic apparatus of claim 1, wherein the processor is further configured to:
based on a point in time after a threshold time from the current point in time not being within the active time, re-obtain the context information, the operation information, and the environment information at a point in time after the end of the active time, re-identify the active time and the inactive time of the user by inputting the re-obtained context information to the first neural network model, based on the point in time after the end of the active time being within the re-identified active time, re-obtain the one or more freezing probabilities by time zones of the washing machine by inputting the re-obtained operation information and the re-obtained environment information to the second neural network model, and identify a second freezing probability greater than or equal to the threshold freezing probability during the re-identified active time and the re-identified inactive time among the re-obtained one or more freezing probabilities by time zones.

7. The electronic apparatus of claim 1, wherein the context information comprises at least one of a use history of a user terminal or washing machine use history of the user, and wherein the operation information comprises at least one of inside temperature of the washing machine, washing time of the washing machine, washing temperature of the washing machine, or power consumption of the washing machine.

8. The electronic apparatus of claim 1, wherein the processor is configured to:

identify a plurality of active times of the user and a plurality of inactive times of the user by inputting the context information to the first neural network model, obtain the one or more freezing probabilities by time zones of the washing machine by inputting the operation information and the environment information to the second neural network model based on the current point in time being within one active time among the plurality of active times, and identify, among the obtained the one or more freezing probabilities by time zones, a third freezing probability greater than or equal to the threshold freezing probability during the one active time and immediately after the one active time among the plurality of inactive times.

9. The electronic apparatus of claim 1, wherein the first neural network model is obtained by learning a relationship of sample context information with respect to a sample active time through a first artificial intelligence algorithm, and wherein the second neural network model is obtained by learning a relationship of sample operation information with respect to a sample environment information by time zones through a second artificial intelligence algorithm.

10. The electronic apparatus of claim 1, wherein the electronic apparatus is the washing machine, and further comprises:

a communication interface; and
a sensor,
wherein the processor is further configured to:
receive the context information of the user from a user terminal through the communication interface,
obtain the operation information from the memory,
obtain the environment information through the sensor, and
control the communication interface to transmit the identified freezing probability to the user terminal.

11. The electronic apparatus of claim 1, wherein the electronic apparatus is the user terminal and further comprises:

a communication interface; and
a display,
wherein the processor is further configured to:
obtain the context information of a user from the memory,
receive the operation information and the environment information from the washing machine through the communication interface, and
control the display to display the identified freezing probability.

12. A method of controlling an electronic apparatus, the method comprising:

obtaining context information of a user, operation information of a washing machine, and environment information of the washing machine;

identifying an active time of the user and an inactive time of the user by inputting the context information into a first neural network model;

obtaining one or more freezing probabilities by time zones of the washing machine by inputting the operation information and the environment information to a second neural network model based on a current point in time being within the active time; and identifying a freezing probability greater than or equal to a threshold freezing probability during the active time and the inactive time among the obtained one or more freezing probabilities by time zones.

13. The method of claim 12, wherein the obtaining the context information, the operation information, and the environment information further comprises receiving the context information of the user from a user terminal and receiving the operation information and the environment information from the washing machine, and wherein the method further comprises transmitting the identified freezing probability to the user terminal.

14. The method of claim 12, wherein the obtaining the one or more freezing probabilities by time zones comprises obtaining the one or more freezing probabilities by time zones for each of a plurality of configurations included in the washing machine by inputting the operation information and the environment information to the second neural network model.

15. The method of claim 12, wherein identifying the freezing probability greater than or equal to the threshold freezing probability comprises:

based on identifying the freezing probability greater than or equal to a first threshold freezing probability during the active time and the inactive time, among the obtained one or more freezing probabilities by time zones, providing a freezing measure guide, and based on identifying the freezing probability greater than or equal to a second threshold freezing probability and less than the first threshold freezing probability during the active time and the inactive time, among the obtained one or more freezing probabilities by time zones, providing a freezing prevention guide.

16. An electronic apparatus for identifying a freezing state of a washing machine, the electronic apparatus comprising:

at least one memory configured to store program code; and
at least one processor configured to read the program code and operate as instructed by the program code, the program code comprising:

first obtaining code configured to cause the at least one processor to obtain context information of a user, operation information of a washing machine, and environment information of the washing machine;

first identifying code configured to cause the at least one processor to identify an active time of the user and an inactive time of the user by inputting the context information into the first neural network model;

second obtaining code configured to cause the at least one processor to obtain one or more freezing probabilities by time zones of the washing machine by inputting the operation information and the environment information to the second neural network model based on a current point in time being within the active time; and second identifying code configured to cause the at least one processor to identify a freezing probability greater than or equal to a threshold freezing probability during the active time and the inactive time based on the obtained one or more freezing probabilities by time zones.

17. The electronic apparatus of claim 16, wherein the program code further comprises:

first reobtaining code configured to cause the at least one processor to, based on a second point in time being within the active time, re-obtain the context information, the operation information, and the environment information at the second point in time, wherein the second point in time is a threshold time after the current point in time;

re-identifying code configured to cause the at least one processor to re-identify the active time of the user and the inactive time of the user by inputting the re-obtained context information to the first neural network model;

second reobtaining code configured to cause the at least one processor to, based on the second point in time being within the re-identified active time, re-obtain the one or more freezing probabilities by time zones of the washing machine by inputting the re-obtained operation information and the re-obtained environment information to the second neural network model; and third identifying code configured to cause the at least one processor to identify a second freezing probability greater than or equal to the threshold freezing probability during the re-identified active time and the re-identified inactive time among the re-obtained one or more freezing probabilities by time zones.

18. The electronic apparatus of claim 16, wherein the program code further comprises:

first reobtaining code configured to cause the at least one processor to, based on a second point in time not being within the active time, re-obtain the context information, the operation information, and the environment information at the end of the active time, wherein the second point in time is a point in time after a threshold time from the current point in time;

re-identifying code configured to cause the at least one processor to re-identify the active time of the user and the inactive time of the user by inputting the re-obtained context information to the first neural network model;

second reobtaining code configured to cause the at least one processor to, based on the end of the active time being within the re-identified active time, re-obtain the one or more freezing probabilities by time zones of the washing machine by inputting the re-obtained operation information and the re-obtained environment information to the second neural network model; and third identifying code configured to cause the at least one processor to identify a second freezing probability greater than or equal to the threshold freezing probability during the re-identified active time and the re-identified inactive time among the re-obtained one or more freezing probabilities by time zones.

* * * * *